United States Patent [19]

Ishikawa

[11] Patent Number: 4,948,182

[45] Date of Patent: Aug. 14, 1990

[54] COVER LOCKING APPARATUS FOR A RECORD MEDIUM PLAYER

[75] Inventor: Akira Ishikawa, Kanagawa, Japan

[73] Assignee: Kabushiki Kaisha Toshiba, Kanagawa, Japan

[21] Appl. No.: 261,199

[22] Filed: Oct. 24, 1988

[30] Foreign Application Priority Data

Oct. 30, 1987 [JP] Japan ............................ 62-166509[U]

[51] Int. Cl.$^5$ ................................................ E05C 7/06
[52] U.S. Cl. ...................................... 292/30; 360/96.6;
    360/137; 292/53; 292/DIG. 21
[58] Field of Search ........................ 292/30, 33, 41, 25,
    292/53, 45, DIG. 21, 24, 26, 29, 44, 48;
    360/96.5, 96.6, 91, 92, 137

[56] References Cited

U.S. PATENT DOCUMENTS

| | | | |
|---|---|---|---|
| 3,902,194 | 8/1975 | Segawa | 360/137 |
| 4,037,053 | 7/1977 | Müller | 360/137 |
| 4,107,753 | 8/1978 | Izumikawa | 360/137 |
| 4,138,151 | 2/1979 | Nakao | 292/DIG. 38 X |
| 4,150,410 | 4/1979 | Tsumura | 360/137 |
| 4,153,919 | 5/1979 | Krämer | 360/137 |
| 4,437,131 | 3/1984 | Hehl | 292/DIG. 38 X |
| 4,496,177 | 1/1985 | Pissot | 292/DIG. 38 X |
| 4,633,353 | 12/1986 | Komatsu | 360/96.6 |
| 4,815,066 | 3/1989 | Horvath | 360/96.6 |

FOREIGN PATENT DOCUMENTS

| | | | |
|---|---|---|---|
| 2100591 | 8/1971 | Fed. Rep. of Germany | 360/96.6 |
| 2845629 | 4/1979 | Fed. Rep. of Germany | 360/96.6 |
| 98895 | 4/1988 | Japan | 360/96.6 |
| 1108499 | 8/1984 | U.S.S.R. | 360/96.6 |

Primary Examiner—Eric K. Nicholson
Attorney, Agent, or Firm—Finnegan, Henderson, Farabow, Garrett and Dunner

[57] ABSTRACT

A cover locking apparatus for a record medium player having two covers movably attached to the player under a bias which includes a lock assembly including a first lock member correspondingly to one cover and a second lock member correspondingly to the other cover, an engaging portion on each cover for interacting with the first and second lock members, respectively, for engaging the covers in a closed positions wherein the covers are held against the bias and a lock release mechanism including only a single manual release button for releasing both the covers from the closed position.

6 Claims, 3 Drawing Sheets

COVER LOCKING APPARATUS FOR A RECORD MEDIUM PLAYER

FIELD OF THE INVENTION

This invention relates to a cover locking apparatus suitable for use in record medium players such as composite players which plays both compact discs and cassette tapes.

BACKGROUND OF THE INVENTION

As is well known, in the field of record medium players, composite players such as double cassette tape players, a compact disc/cassette tape players (referred as to CD/cassette players hereafter), etc. are widely used. The double cassette tape player has two tape compartments each for accommodating a cassette tape therein. The CD/cassette player also has two compartments for accommodating a compact disc (referred as to CD hereafter) and a cassette tape, respectively. These compartments are covered with covers movably attached to the player for allowing loading/unloading of the cassette tape and/or CD into the corresponding compartments.

Referring now to FIG. 1, a conventional cover locking apparatus for a CD/cassette player will be described. As shown in FIG. 1, the CD/cassette player 10 comprises a housing 12, a first cover 14 and a second cover 16. The housing 12 of the player 10 has two compartments (not shown), i.e.. a CD compartment and a cassette tape compartment. The CD compartment accommodates a CD therein. The cassette tape compartment accommodates a cassette tape therein. The first and second covers 14 and 16 are movably mounted to the front panel 18 of the housing 12 for covering the CD and the cassette tape compartments, respectively.

The second cover 16 is mounted behind the first cover 14, as shown by the broken line in FIG. 1. The second cover 16 is provided on a recess portion defined in the front panel 18 of the housing 12. The first cover 14 is provided for covering both the second cover 16 and the CD compartment, which are aligned adjacent to the each other.

Bottom ends 14a and 16a of the first and second covers 14 and 16 are pivotally mounted to front panel 18 of the housing 12. Thus, the first and second covers 14 and 16 can rockably move between their closed positions and their opened positions, respectively. The first and second covers 14 and 16 are biased by first and second cover bias means (not shown) such as springs so that the first and second covers 14 and 16 are rocked towards their opened positions in accordance with the first and second cover bias means. In the opened positions of the first and second covers 14 and 16, a CD and a cassette tape can be loaded into the CD compartment and the cassette tape compartment or unloaded therefrom, respectively.

The player 10 further comprises a pair of first and second lock release buttons 20 and 22 and a pair of first and second locking mechanisms (not shown). Both the first and second look release buttons 20 and 22 are mounted on the top 24 of the player 10.

The first locking mechanism is associated with the first lock release button 20 in the player 10. The first locking mechanism locks the first cover 14 in its closed position against the first cover bias means. The first lock release button 20 releases the first looking mechanism so that the first cover 14 is rocked to its opened position in accordance with the first cover bias means.

The second locking mechanism is associated with the second lock release button 22 in the player 10. The second locking mechanism locks the second cover 16 in its closed position against the second cover bias means. The second lock release button 22 releases the second locking mechanism so that the second cover 16 is rocked to its opened position in accordance with the second cover bias means.

The first and second covers 14 and 16 are automatically locked by the first and second locking mechanisms respectively, when they have been manually brought to their closed positions against the first and second cover bias means. The first and second covers 14 and 16 are brought to their closed positions by manually or automatically moving them against the first and second cover bias means.

The first cover 14 is opened by manually operating the first lock release button 20. The second cover 16 can be opened by manually operating the second lock release button 22, after the first cover 14 has been opened. The second cover 16 is closed by moving it against the second cover bias means. The first cover 14 is closed by moving it against the first cover bias means, after the second cover 16 has been closed.

According to the conventional CD/cassette player of FIG. 1, there is the possibility of operating the second lock release button 22 in the state that the first cover 14 is closed. Further the CD/cassette player has a somewhat inferior appearance because of both the first and second lock release buttons 20 and 22 protruding outside the player.

Referring now to FIG. 2, another conventional cover locking apparatus for a CD/cassette player will be described. The CD/cassette player of FIG. 2 has a construction similar to the CD/cassette player 10 of FIG. 1. Therefore, reference numerals used in the description of the CD/cassette player of FIG. 1 will be used to designate like or equivalent elements for simplicity of explanation in the following description of the CD/cassette player of FIG. 2 and descriptions for the like or equivalent portions will be eliminated hereafter.

As shown in FIG. 2, the CD/cassette player is different from the CD/cassette player of FIG. 1 in that the second lock release button 22 is mounted on the recess portion defined in the front panel 18 of the housing 12. Thus, the second lock release button 22 can be operated only after the first cover 14 has been opened. As a result, a malfunction of operating the second lock release button 22 can be prevented. Further the CD/cassette player has an better appearance than the CD/cassette player of FIG. 1 because of the second lock release button 22 being concealed by the first cover 20.

However, both the conventional cover locking apparatus of FIG. 1 and 2 still have some drawbacks. For example, the first and second covers 14 and 16 must be operated by separate lock release buttons, i.e., the first and second buttons 20 and 22. This causes a difficulty of operation during the loading of CDs and cassette tapes therein. The CD/cassette player of FIG. 2 is superior in the appearance in comparison to the player of FIG. 1, as described above. However, CD/cassette player of FIG. 2 still has a drawback in that the second lock release button 22 is difficult to operate because it is mounted on the recess portion.

SUMMARY OF THE INVENTION

It is, therefore, an object of the present invention to provide a cover locking apparatus suitable for use in record medium players which is easy to operate.

Another object of the present invention to provide a cover locking apparatus suitable for use in record medium players which has in improved appearance.

In order to achieve the above object, a cover locking apparatus suitable for use in record medium players having two covers attached thereto under a bias according to one aspect of the present invention includes a lock assembly including a first lock member correspondingly to one cover and a second lock member correspondingly to the other cover, an engaging portion on each cover for interacting with the first and second lock members, respectively, for engaging the covers in a closed positions wherein the covers are held against the bias and a lock release mechanism including only a single manual release button for releasing both the covers from the closed position.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
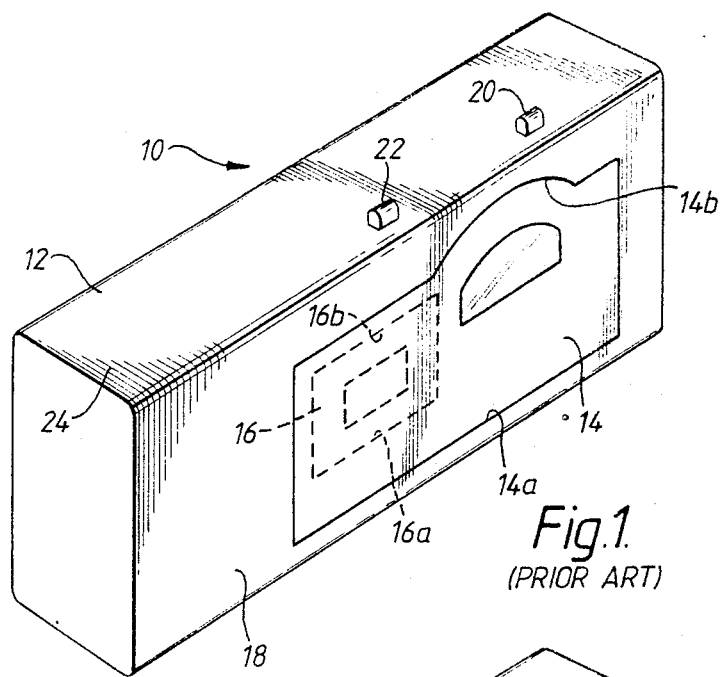
FIG. 1 is a perspective view showing a conventional CD/cassette player.
Figure 2:
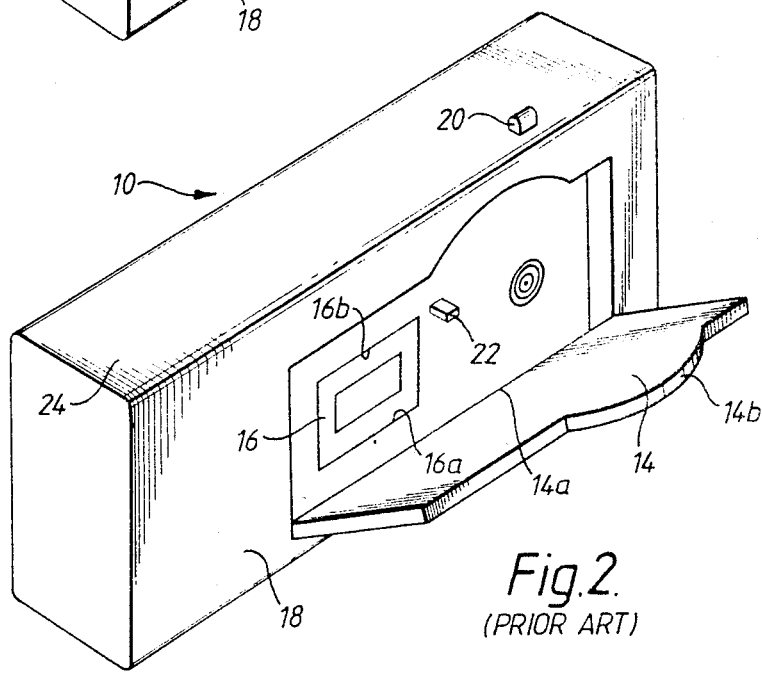
FIG. 2 is a perspective view showing another conventional CD/cassette player.

The present invention will be described in detail with reference to FIG. 3 and 4. Throughout the drawings, reference numerals or letters used in FIGS. 1 and 2 (Prior Art) will be used to designate like or equivalent elements for simplicity of explanation.

Figure 3:
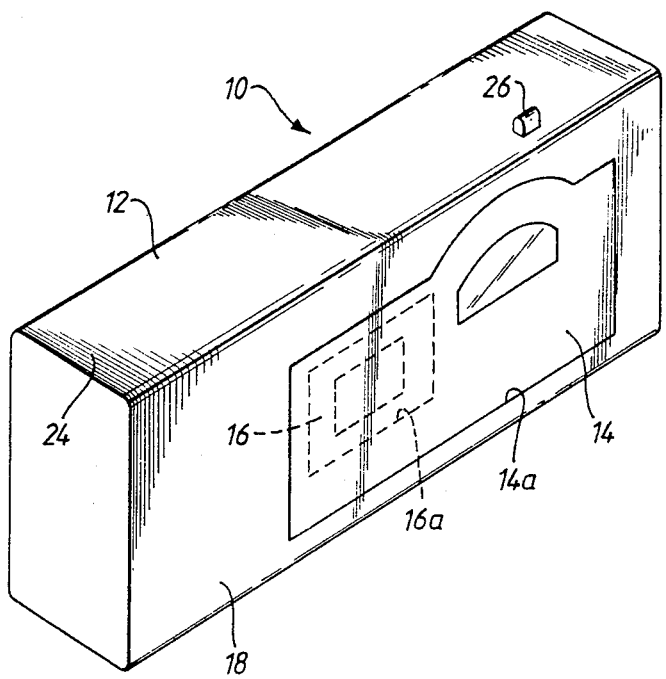
FIG. 3 is a perspective view showing a CD/cassette player comprising a cover locking apparatus according to the present invention.

Referring now to FIG. 3, an embodiment of the cover locking apparatus suitable for use in record medium players according to the present invention will be described in detail. FIG. 3 is a perspective view showing a CD/cassette player 10 comprising the cover locking apparatus according to the present invention.

As shown in FIG. 3, the CD/cassette player 10 comprises a housing 12, a first cover 14 and a second cover 16. The housing 10 of the player 10 has two compartments (not shown) i.e. a CD compartment and a cassette tape compartment. The CD compartment accommodates a CD therein. The cassette tape compartment accommodates a cassette tape therein. The first and second covers 14 and 16 are movably mounted to the front panel 18 of the housing 12 for covering the CD and the cassette tape compartments, respectively.

The second cover 16 is mounted behind the first cover 14, as shown by the broken line in FIG. 3. The second cover 16 is provided on a recess portion defined in the front panel 18 of the housing 12. The first cover 14 is provided for covering both the second cover 16 and the CD compartment, which are aligned adjacent to the each other.

Bottom ends 14a and 16a of the first and second covers 14 and 16 are pivotally mounted to front panel 18 of the housing 12. Thus, the first and second covers 14 and 16 can rockably move between their closed positions and their opened positions, respectively. The first and second covers 14 and 16 are biased by a first and second cover bias means (not shown) such as springs, so that the first and second covers 14 and 16 are rocked towards their opened positions in accordance with the first and second cover bias means. In the opened positions of the first and second covers 14 and 16, a CD and a cassette tape can be loaded into the CD compartment and the cassette tape compartment or unloaded therefrom, respectively.

The player 10 further comprises a lock release button 26 and a pair of first and second locking mechanisms. The lock release button 26 is mounted on the top 24 of the housing 12. The first and second locking mechanisms are not shown in FIG. 3, but they will be described below in detail in reference to FIG. 4.

Figure 4:
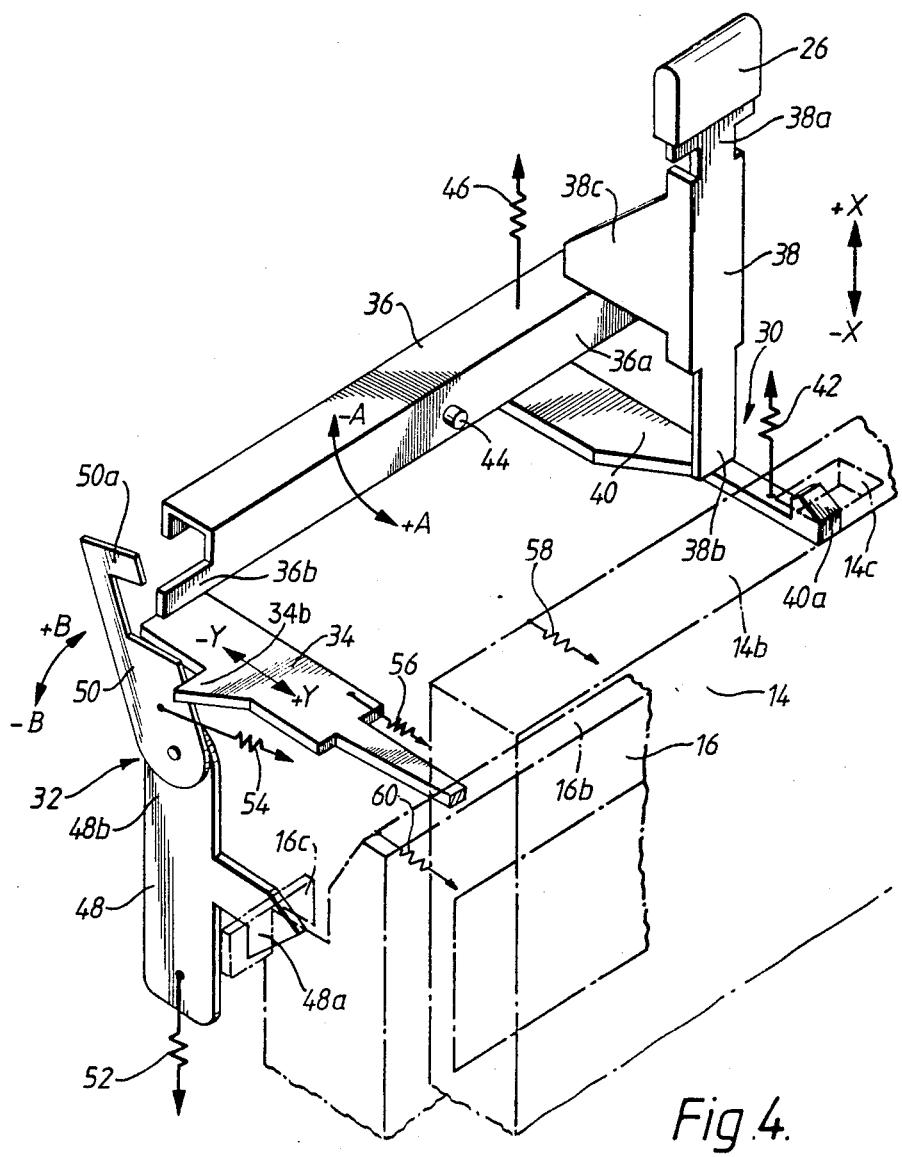
FIG. 4 is a perspective view showing the cover locking apparatus of FIG. 3.

Referring now to FIG. 4, the cover locking apparatus of FIG. 3 will be described in detail. As shown in FIG. 4, the cover locking apparatus comprises the first and second locking mechanisms 30 and 32, a control slider 34, a drive lever 36, a lock release member 38 and the lock release button 26.

The first locking mechanism 30 comprises a first lock lever 40 and a first look bias spring 42. One end of the first lock lever 40 forms a first hook 40a. Another end of the first lock lever 40 is rockably mounted on a chassis (not shown). The first lock lever 40 is biased by the first lock bias spring 42 in the direction, as shown by an arrow +X in the drawing, so that the first hook 40a engages with an engagement portion like a depression 14c defined in the first cover 14 when the first cover 14 is in the closed position.

Top end 38a of the lock release member 38 is attached to the lock release button 26. Bottom end 88b of the lock release member 38 faces the first lock lever 40. Thus, the first lock lever 40 is rocked against the first lock bias spring 42 by the lock release member 38 when the lock release button 26 is pressed down in the direction of an arrow −X in the drawing. The first hook 40a of the first lock lever 40 disengages from the depression 14c of the first cover 14 so that the first cover 14 is opened in accordance with the bias of the first cover bias means 58.

The lock release member 38 has an engaging portion 38c. The engaging portion 38c extends to the rocking path of a first end 36a of the drive lever 36. The drive lever 36 is rockably mounted to the chassis by a support pin 44. The drive lever 36 is biased by a drive lever bias spring 46 in the counter-clockwise direction, as shown by an arrow +A in the drawing, so that the first end 36a of the drive lever 36 engages with the engaging portion 38c of the lock release member 38. A second end 36b of the drive lever 36 extends towards the second locking mechanism 32.

The second locking mechanism 32 comprises a lock slider 48 and a second lock lever 50. The lock slider 48 has a second hook 48a extending towards the second cover 16. The lock slider 48 is slidably mounted to the chassis. The lock slider 48 is biased by a second lock bias spring 52 in the direction of the arrow −X, so that the second hook 48a engages with an engagement portion such as a depression 16c defined in the second cover 16.

The second lock lever 50 is rockably mounted on a top end 48b of the lock slider 48. The second lock lever 50 has a third hook 50a. The second lock lever 50 is biased by a third lock bias spring 54 in the clockwise direction, as shown by an arrow +B in the drawing, so that the third hook 50a intersects the rocking path of the second end 36b of the drive lever 36.

The control slider 34 is slidably mounted between the first cover 14 and the second lock lever 50. The control slider 34 has an engaging portion 34b extending in the rocking path of the second lock lever 50. The control slider 34 is biased by a fourth lock bias spring 56 in the direction, as shown by an arrow +Y in the drawing, so that the front end of the control slider 34 engages with first cover 14 when the first cover 14 is in the closed position.

Now the operation of the cover locking apparatus of FIG. 4 will be described.

It is assumed that both the first and second covers 14 and 16 are closed. In this state, the first hook 40a of the first lock lever 40 engages with the depression 14c of the first cover 14. The second hook 48a of the lock slider 48 engages with the depression 16c of the second cover 16. The first over 14 engages with the control slider 34, so that the control slider 34 slides in the direction of the arrow Y against the fourth lock bias spring 56. Thus, the second lock lever 50 is rocked in the counter-clockwise direction, as shown by an arrow −B in the drawing against the third lock bias spring 54. In this state, the third hook 50a of the second lock lever 50 is out of the rooking path of the second end 36b of the drive lever 36.

When the lock release button 26 is pressed down in the direction of the arrow +X, the bottom end 38b end the engaging portion 38c of the lock release member 38 simultaneously run against the first lock lever 40 and the drive lever 36.

The first lock lever 40 is rocked in the direction of the arrow −X by the bottom end 38b against the first lock bias spring 42. The first hook 40a of the first lock lever 40 disengages from the depression 14c of the first cover 14. Thus, the first cover 14 is opened in accordance With the first cover bias means 58.

The drive lever 36 is rocked in the clockwise direction, as shown by an arrow −A in the drawing by the engaging portion 38c against the drive lever bias spring 46. The second end 36b of the drive lever 36 moves to a raised position without running against the third hook 50a of the second lock lever 50. Thus, the drive lever 36 works uselessly. This is because the second look lever 50 has been impeded in its movement in the direction of the arrow +B by the control slider 34.

Thus, the operation of the lock release button 26 causes only the first cover 14 to open, but leaves the second cover 16 in the closed position. When the depression of the lock release button 26 is removed, both the lock release member 38 and the first lock lever 40 are automatically restored to their original positions by the first lock bias spring 42. The drive lever 36 is also rocked in the direction of the arrow +A by the drive lever bias spring 46.

After the first cover 14 has been opened, the control slider 34 is moved in the direction of the arrow +Y by the fourth lock bias spring 56. The second lock lever 50 is rocked in the direction of the arrow +B by the third lock bias spring 54. Thus, the third hook 50a of the second lock lever 50 goes to the position intersecting the rocking path of the second end 36b of the drive lever 36.

When the lock release button 26 is pressed down in the direction of the arrow −X, the bottom end 38b and the engaging portion 38c of the lock release member 38 simultaneously run against the first lock lever 40 and the drive lever 36.

The first lock lever 40 is rocked in the direction of the arrow −X by the bottom end 38b against the first lock bias spring 42. However, the first lock lever 40 works uselessly, because the first cover 14 has been disengaged from the first hook 40a of the first lock lever 40.

The drive lever 36 is rocked in the direction of the arrow −A by the engaging portion 38c against the drive lever bias spring 46. The second end 36b of the drive lever 36 runs against the third hook 50a of the second lock lever 50 during the rocking movement. The drive lever 36 pulls up both the second lock lever 50 and the lock slider 48 in the direction of the arrow +X against the second lock bias spring 52. As a result, the second hook 48a of the lock slider 48 is disengaged from the depression 16c of the second cover 16. The second cover 16 is then opened by the second cover bias means 60.

As is mentioned above, the first depression of the lock release button 26 causes only the first cover 14 to open, but leaves the second cover 16 in the closed position. The second depression of the lock release button 26 causes the second cover 14 to open. Thus, the first and second covers 14 and 16 are operated by the single lock release button 26.

As described above, the present invention can provide an extremely preferable cover locking apparatus for use in the record medium players, such as the CD/cassette players.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A cover locking apparatus for a record medium player having two covers movably attached to the player under a bias, comprising:
    a lock assembly including a first lock member correspondingly to one cover and a second lock member correspondingly to the other cover;
    engaging means on each cover for interacting with the first and second lock members, respectively, for engaging the covers in a closed positions wherein the covers are held against the bias; and lock release means including only a single manual release member for releasing both the covers from the closed position.

2. The locking apparatus of claim 1 wherein the lock assembly includes control means responsive to movement of the one cover for controlling the second lock member.

3. The locking apparatus of claim 2 wherein the release member includes means responsive to movement of the release member for disengaging the first lock member from the engaging means of the one cover.

4. The locking apparatus of claim 3 wherein the lock assembly also includes a drive member responsive to movement of the release member for releasing the second lock member from the engaging means of the other cover only when the one cover is not in the closed position.

5. The locking apparatus of claim 4 wherein the second lock member includes a lock slider for interacting with the engaging means of the other cover and a look lever pivoted to the lock slider for engaging with the drive member in response to the control means.

6. The locking apparatus of claim 5 wherein each of the first and second lock members includes a hook thereon for interacting with the corresponding engaging means of the covers.

* * * * *